(12) United States Patent
Soulier et al.

(10) Patent No.: US 9,611,807 B2
(45) Date of Patent: Apr. 4, 2017

(54) GAS EJECTION CONE FOR AIRCRAFT TURBOJET ENGINES

(71) Applicant: AIRCELLE, Gonfreville l'Orcher (FR)

(72) Inventors: Pascal-Marie Paul Marcel Soulier, Le Havre (FR); Jean-Bernard Guillon, Le Havre (FR); Jean-Pierre Guegou, Mannevillette (FR)

(73) Assignee: AIRCELLE, Gonfeville l'Orcher (FR)

( * ) Notice: Subject to any disclaimer, the term of this patent is extended or adjusted under 35 U.S.C. 154(b) by 233 days.

(21) Appl. No.: 14/484,684

(22) Filed: Sep. 12, 2014

(65) Prior Publication Data

US 2015/0000289 A1 Jan. 1, 2015

Related U.S. Application Data

(63) Continuation of application No. PCT/FR2013/050326, filed on Feb. 18, 2013.

(30) Foreign Application Priority Data

Mar. 20, 2012 (FR) ..................... 12 52473

(51) Int. Cl.
*F02K 1/36* (2006.01)
*F02K 1/04* (2006.01)
*B64C 7/02* (2006.01)

(52) U.S. Cl.
CPC ................. *F02K 1/36* (2013.01); *B64C 7/02* (2013.01); *F02K 1/04* (2013.01)

(58) Field of Classification Search
CPC ............... F02K 1/36; F02K 1/04; B64C 7/02

USPC .......................................................... 60/770
See application file for complete search history.

(56) References Cited

U.S. PATENT DOCUMENTS

| 4,238,092 A | 12/1980 | Brennan | |
|---|---|---|---|
| 4,239,155 A * | 12/1980 | Foa ........................ | B63H 11/00 239/265.17 |
| 4,681,283 A * | 7/1987 | Kranz ................... | F42B 10/663 244/3.22 |
| 5,230,214 A * | 7/1993 | Pechette ................... | F02K 1/04 60/725 |
| 6,260,352 B1 | 7/2001 | Negulescu et al. | |

(Continued)

FOREIGN PATENT DOCUMENTS

| EP | 1 744 045 A1 | 1/2007 |
|---|---|---|
| EP | 1 878 894 A1 | 1/2008 |

OTHER PUBLICATIONS

International Search Report issued Jun. 5, 2013 in International Application No. PCT/FR2013/050326.

*Primary Examiner* — Steven Sutherland
(74) *Attorney, Agent, or Firm* — Burris Law, PLLC

(57) ABSTRACT

A gas ejection cone includes a cylindrical-shaped front cone portion, a conical-shaped rear cone portion, a ventilation tube and a support bearing of this drainage and/or ventilation tube. The ventilation tube extends inside the cylindrical-shaped front and conical-shaped rear cone portions and emerges at the end of the conical-shaped rear cone portion. In particular, the conical-shaped rear cone portion includes a front sub-portion connected to the cylindrical-shaped front cone portion, and a rear sub-portion removably secured to the front sub-portion. The rear sub-portion is further equipped with an outlet port of the ventilation tube.

12 Claims, 2 Drawing Sheets

(56) References Cited

U.S. PATENT DOCUMENTS 7,721,549 B2 * 5/2010 Baran ............... F02K 1/002
 239/265.19
2001/0043864 A1 * 11/2001 Maruyama ............ F04B 7/06
 417/44.1

* cited by examiner

US 9,611,807 B2

GAS EJECTION CONE FOR AIRCRAFT TURBOJET ENGINES

CROSS-REFERENCE TO RELATED APPLICATIONS

This application is a continuation of International Application No. PCT/FR2013/050326, filed on Feb. 18, 2013, which claims the benefit of FR 12/52473, filed on Mar. 20, 2012. The disclosures of the above applications are incorporated herein by reference.

FIELD

The present disclosure relates to gas ejection cones for aircraft turbojet engines.

BACKGROUND

The statements in this section merely provide background information related to the present disclosure and may not constitute prior art.

As shown in FIG. 1, it is generally appropriate to provide for an ejection cone 1 at the back of an aircraft turbojet engine T, in order to, on the one hand, optimize the flow of hot gases expelled by the turbojet engine, and on the other hand, absorb at least part of the noise generated by the interaction of these hot gases with ambient air and with the cold air flow expelled by the fan of the turbojet engine.

Such a conventional ejection cone 1 is shown in FIG. 2, on which the upstream and the downstream (relative to the flow direction of the ejection gases of the turbojet engine) are situated respectively on the left and on the right of the figure.

This cone is intended to be positioned downstream of the turbojet engine turbine T, concentrically to a shell, or nozzle 3, in turn secured to the downstream edge of the combustion chamber of the turbojet engine T.

More specifically, the ejection cone 1 comprises, strictly speaking, a front cone portion 5 (often called "front plug"), of substantially cylindrical shape, and a rear cone portion 7 (often called "rear plug") of conical shape.

These two ejection cone portions may typically be formed from sheets of metal alloy of the Inconel 625 or titanium B21s type, stiffened by concentric stiffeners 9a, 9b, 9c, 9d.

The front portion 5 may present an acoustic absorption function, in which case the external sheet forming this portion is perforated, sandwich structures of the honeycomb type being placed inside these sheets facing their perforations.

Furthermore, the front 5 and rear 7 portions may be formed into two removable elements, as seen in FIG. 2, these two elements being therefore secured to each other by means of flanges 9b, 9c (also fulfilling the function of stiffeners) connected to each other for example by screwing.

Alternatively, these front 5 and rear 7 portions can be irremovably connected to each other, either because they form a one-piece assembly, or because they are secured to each other for example by welding.

In some cases, it is necessary to provide for a drainage and/or ventilation tube 11 of oil and/or air coming from the turbojet engine, this tube emerging at the tip of the rear cone portion 7 (see FIG. 1).

This tube is conventionally secured to the turbojet engine T and maintained by means of a bearing disposed inside the rear cone portion 7; taking into account the strong vibrations generated by the turbojet engine, significant frictions occur between the tube and the bearing, generating wear of these parts.

For this reason at least, it is appropriate to be able to inspect these parts regularly.

Conventionally, this inspection requires the removal of the rear cone portion 7 relative to the front cone portion 5 when the ejection cone 1 is made of two removable portions, or the complete removal of the cone 1 when the front 5 and rear 7 portions are irremovably connected to each other.

These removal operations take a long time to implement, and require the intervention of several operators, in particular given the relatively significant weight of the parts to be manipulated.

SUMMARY

The present disclosure provides a gas ejection cone for turbojet engines equipped with a ventilation and/or drainage tube, which allows to easily perform, with minimum number of operators, the inspection in particular of the area of cooperation of this tube with its support bearing.

The present disclosure provides a gas ejection cone, comprising:
  a substantially cylindrical-shaped front cone portion,
  a substantially conical-shaped rear cone portion,
  a drainage and/or ventilation tube extending inside these front and rear cone portions, and emerging at the end the rear cone portion,
  a support bearing of this drainage and/or ventilation tube, disposed inside said rear cone portion,
  this gas ejection cone being characterized in that said rear cone portion in turn comprises a front sub-portion connected to said front cone portion and a rear sub-portion removably secured on said front sub-portion, equipped with an outlet port of said drainage and/or ventilation tube.

Thanks to these features, it suffices to remove the rear sub-portion from the front sub-portion in order to be able to inspect the area of cooperation of the drainage and/or ventilation tube with its support bearing, and more generally, in order to be able to inspect the whole inside of the gas ejection cone.

If necessary, an endoscope may be used for this purpose.

The present disclosure thus allows avoiding to have to remove the whole rear portion of the gas ejection cone, or even the whole gas ejection cone when its front and rear portions are irremovably connected to each other: we can therefore perform inspection operations from the inside of this cone, and in particular the area of cooperation of the drainage and/or ventilation tube with its support bearing, with the minimum number of operators.

According to other features of the present disclosure:
  said bearing is secured inside of said front sub-portion;
  said bearing is secured inside of said rear sub-portion;
  said bearing is hold in place by the edges of said front and rear sub-portions;
  said bearing presents a substantially annular shape;
  the axial length of said rear sub-portion is limited to the functional need for the installation and inspection of said drainage and/or ventilation tube;
  the largest diameter of said rear sub-portion is comprised between 10 and 20% of the largest diameter of said front sub-portion;
  the largest diameter of said front sub-portion is comprised between 80 and 95% of the largest diameter of said front cone;

said front cone portion and said front sub-portion are irremovably connected to each other; and said front cone portion and said front sub-portion are irremovably connected to each other.

The present disclosure also relates to a nacelle equipped with such a gas ejection cone.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
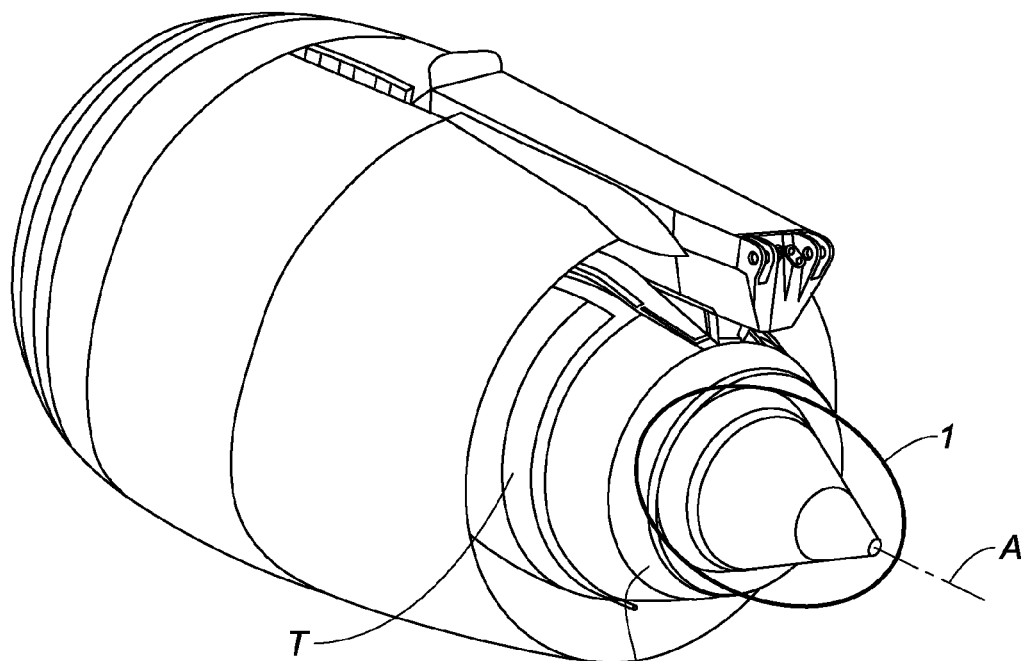
FIG. 1 is a perspective overview of an aircraft turbojet engine surrounded by its nacelle equipped with a gas ejection cone according to the state of the art.
Figure 2:
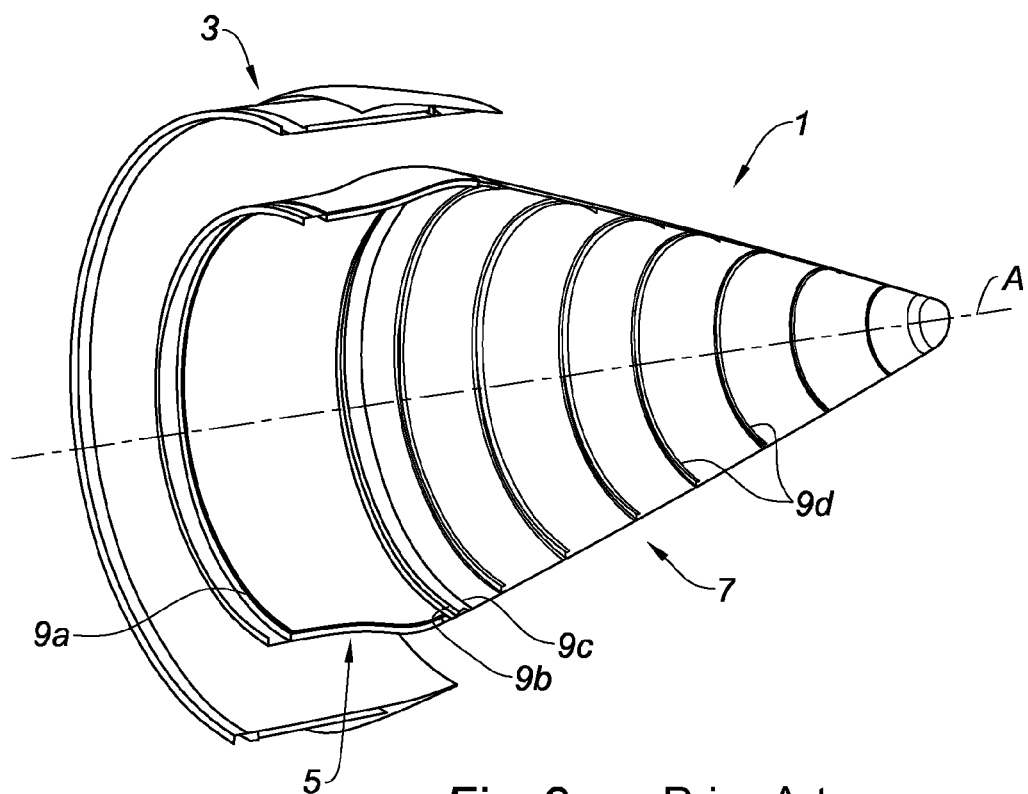
FIG. 2 is a perspective and sectional view of a typical gas ejection cone according to the state of the art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

We will use in the following description the terms "front" and "rear".

These terms must be understood relative to the direction of air circulation in the nacelle when the turbojet engine is in operation.

More specifically, these front and rear portions are respectively situated on the left and on the right of each of the attached figures.

Figure 3:
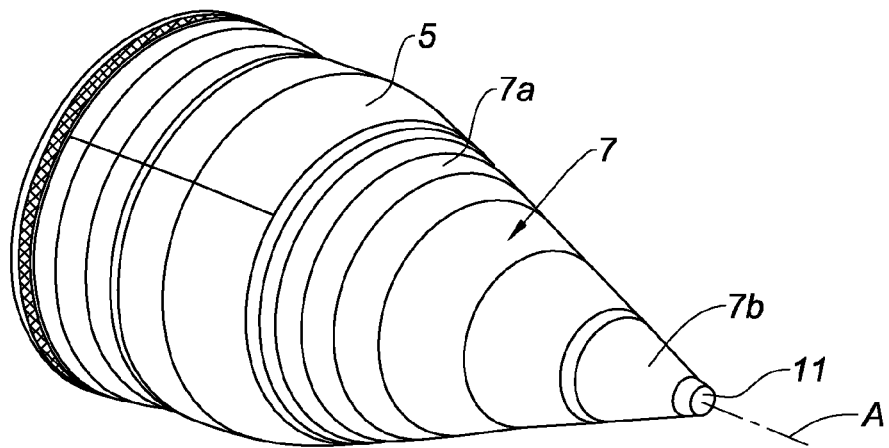
FIG. 3 is a perspective view of a gas ejection cone according to the present disclosure.
Figure 4:
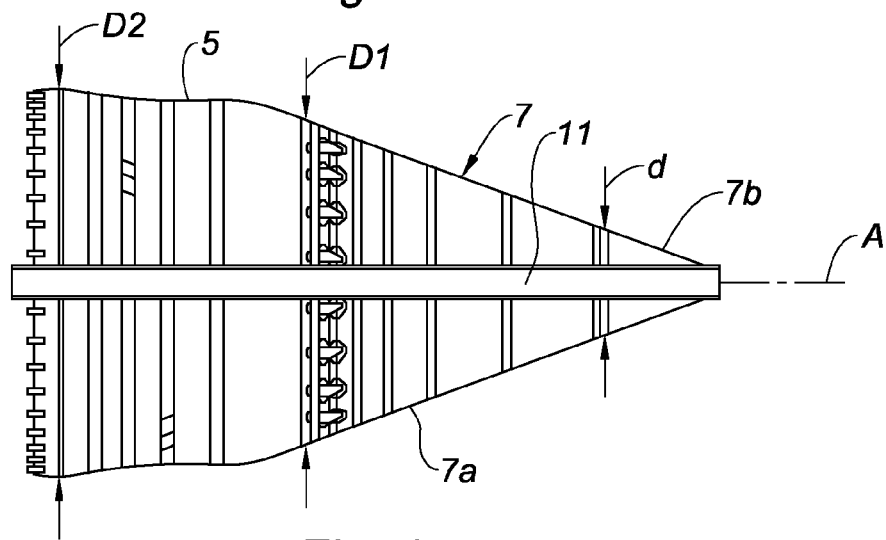
FIG. 4 is an axial sectional view of the ejection cone of FIG. 3.

We have represented in FIGS. 3 and 4 an ejection cone 1 according to the present disclosure, comprising two main portions, namely a substantially cylindrical-shaped front cone portion 5, and a substantially conical-shaped rear cone portion 7.

These front 5 and rear 7 cone portions may be irremovably connected to each other, for example by welding, or in a removable manner, for example by screwing, as is the case in the form shown in FIGS. 3 and 4.

The rear cone portion 7 in turn comprises a front sub-portion 7a and a rear sub-portion 7b, the latter being removably connected, for example by screwing, thereon.

The rear sub-portion 7b includes a port at its end, allowing the outlet of a drainage and/or ventilation tube 11 connected to the turbojet engine T.

It is therefore understood that the front 7a and rear 7b sub-portions each form in reality a truncated cone with the same axis and the same apex angle.

Figure 5:
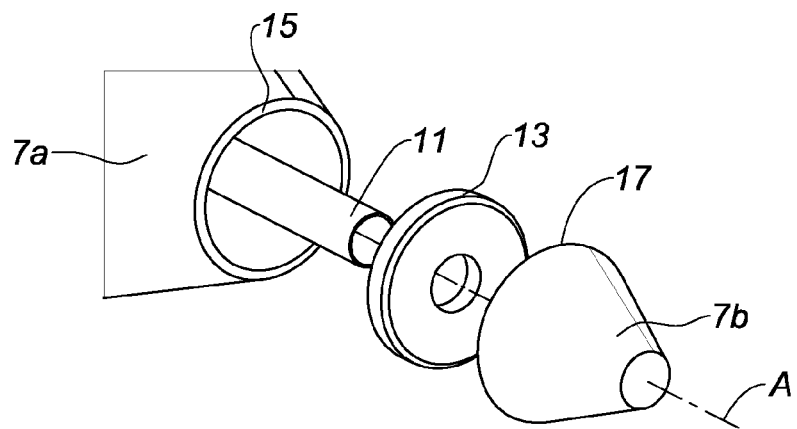
FIG. 5 is a detailed exploded perspective view of the rear end of the ejection cone of FIGS. 3 and 4.

As shown in FIGS. 4 and 5, the drainage and/or ventilation tube 11 is maintained centered inside the gas ejection cone 1 by a bearing 13 situated at the interface between the front sub-portion 7a and the rear sub-portion 7b of the rear cone portion 7.

This bearing 13, which presents a substantially annular shape allowing its crossing by the drainage and/or ventilation tube 11, may be secured on the edge 15 of the front sub-portion 7a, or on the edge 17 of the rear sub-portion 7b, or may be simply clamped between these two edges when the rear sub-portion 7b is secured on the front sub-portion 7a.

The length of said rear sub-portion is limited to the functional need for installation and the inspection.

In one form, as seen in FIG. 4, the largest diameter d of the rear sub-portion 7b is typically comprised between 10 and 20% of the largest diameter D1 of the front sub-portion 7a.

This largest diameter D1 is in turn typically comprised between 80 and 95% of the largest diameter D2 of the front cone portion 5.

As it can be understood in the light of the description above, when it is desired to inspect the area of cooperation of the drainage and/or ventilation tube 11 with its support bearing 13, it suffices to remove the rear sub-portion 7b from the front sub-portion 7a.

The small dimensions of this rear sub-portion 7b allow its rapid removal and its manipulation by a single operator.

Once this sub-portion 7b is removed, the operator can inspect not only the area of cooperation, but also the inside of the ejection cone 1 assembly, if necessary with an endoscope.

Of course, the present disclosure is not limited to the described and shown forms, provided as simple examples.

What is claimed is:

1. A gas ejection cone, comprising:
   a cylindrical-shaped front cone portion;
   a conical-shaped rear cone portion;
   a drainage and/or ventilation tube extending inside the cylindrical-shaped front cone portion and the conical-shaped rear cone portion, the drainage and/or ventilation tube emerging at an end of the conical-shaped rear cone portion; and
   a support bearing of the drainage and/or ventilation tube which is disposed inside the conical-shaped rear cone portion,
   wherein the conical-shaped rear cone portion is fixed and comprises a front sub-portion secured fixedly to the cylindrical-shaped front cone portion, and a rear sub-portion secured fixedly to the front sub-portion such that the front and rear sub-portions cannot rotate relative to the cylindrical-shaped front cone portion, the rear sub-portion being equipped with an outlet port of the drainage and/or ventilation tube and being removable from the front sub-portion in order to inspect an inside of the gas ejection cone.

2. The gas ejection cone according to claim 1, wherein said support bearing is secured inside the front sub-portion.

3. The gas ejection cone according to claim 1, wherein said support bearing is secured inside the rear sub-portion.

4. The gas ejection cone according to claim 1, wherein said support bearing is held in place by edges of the front and rear sub-portions.

5. The gas ejection cone according to claim 1, wherein said support bearing presents an annular shape.

6. The gas ejection cone according to claim 1, wherein a length of said rear sub-portion configured for installation and inspection.

7. The gas ejection cone according to claim 1, wherein a largest diameter of the rear sub-portion is between 10% and 20% of a largest diameter of the front sub-portion.

8. The gas ejection cone according to claim 1, wherein a largest diameter of the front sub-portion is between 80% and 95% of a largest diameter of the cylindrical-shaped front cone portion.

9. The gas ejection cone according to claim 1, wherein the cylindrical-shaped front cone portion and the front sub-portion are irremovably connected to each other.

10. The gas ejection cone according to claim 1, wherein the support bearing is clamped between an edge of the front sub-portion and an edge of the rear sub-portion when the rear sub-portion is secured on the front sub-portion.

11. The gas ejection according to claim 1, wherein the drainage and/or ventilation tube is maintained centered inside the gas ejection cone by the support bearing situated at an interface between the front sub-portion and the rear sub-portion.

12. A nacelle equipped with the gas ejection cone according to claim 1.

* * * * *